(12) United States Patent
Nakayama et al.

(10) Patent No.: US 10,484,121 B2
(45) Date of Patent: Nov. 19, 2019

(54) RECEIVER OPTICAL MODULE IMPLEMENTING OPTICAL ATTENUATOR

(71) Applicant: Sumitomo Electric Industries, Ltd., Osaka-shi (JP)

(72) Inventors: Kenichi Nakayama, Osaka (JP); Masanobu Kawamura, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/021,582

(22) Filed: Jun. 28, 2018

(65) Prior Publication Data

US 2019/0007154 A1 Jan. 3, 2019

(30) Foreign Application Priority Data

Jun. 30, 2017 (JP) .................................. 2017-128769
Jun. 30, 2017 (JP) .................................. 2017-128770
Feb. 27, 2018 (JP) .................................. 2018-033778

(51) Int. Cl.
*H04J 14/02* (2006.01)
*G02B 6/42* (2006.01)

(52) U.S. Cl.
CPC ............ *H04J 14/02* (2013.01); *G02B 6/4215* (2013.01); *G02B 6/4292* (2013.01)

(58) Field of Classification Search
CPC .... H04J 14/02; H04J 14/0204; H04J 14/0205; G02B 6/4215; G02B 6/4292; G02B 6/2938; G02B 6/29367; G02B 6/3512; H04Q 2011/0016; H04Q 2011/0009; H04B 10/60; H04B 10/67

USPC .................................. 398/79, 82, 85, 86, 87
See application file for complete search history.

(56) References Cited

U.S. PATENT DOCUMENTS

| | | | | | |
|---|---|---|---|---|---|
| 6,008,920 | A | * | 12/1999 | Hendrix | G02B 6/2938 359/633 |
| 6,148,124 | A | * | 11/2000 | Aksyuk | G02B 6/12019 385/18 |
| 6,636,658 | B2 | * | 10/2003 | Goodman | G02B 6/2713 385/24 |
| 7,120,361 | B2 | * | 10/2006 | Tei | G02B 6/29367 398/85 |
| 7,424,223 | B1 | * | 9/2008 | Lundquist | G02B 6/12021 385/24 |

(Continued)

FOREIGN PATENT DOCUMENTS

JP 2013-125045 A 6/2013

*Primary Examiner* — Hibret A Woldekidan
(74) *Attorney, Agent, or Firm* — Baker Botts L.L.P.; Michael A. Sartori

(57) ABSTRACT

A receiver optical module is disclosed where the receiver optical module includes a coupling unit, an optical de-multiplexer, and an optical attenuator. The coupling unit secures an optical fiber. The optical de-multiplexer de-multiplexes a wavelength multiplexed optical beam that is provided from the optical fiber and multiplexes optical signals. The optical attenuator attenuates the wavelength multiplexed signal. A feature of the receiver optical module is that the optical de-multiplexer has a plurality of multi-layered dielectric films each pass one of the optical signals and has a rectangular shape with a shorter side and a longer side; while, the optical attenuator provides a shutter that is movable along the longer side of the multi-layered dielectric films.

13 Claims, 16 Drawing Sheets

(56) References Cited

U.S. PATENT DOCUMENTS

| | | | |
|---|---|---|---|
| 7,676,157 B2* | 3/2010 | Strasser | G02B 6/29367 |
| | | | 398/85 |
| 9,197,345 B2* | 11/2015 | Nakajima | H04J 14/02 |
| 10,090,934 B2* | 10/2018 | Hara | H04B 10/66 |
| 10,128,974 B2* | 11/2018 | Kawamura | H04J 14/04 |
| 2005/0084205 A1* | 4/2005 | Hong | G02B 6/266 |
| | | | 385/22 |
| 2013/0148970 A1 | 6/2013 | Nakajima et al. | |
| 2014/0133862 A1* | 5/2014 | Fujimura | G02B 6/4215 |
| | | | 398/79 |
| 2014/0346323 A1* | 11/2014 | Fujimura | G01J 1/44 |
| | | | 250/208.2 |
| 2015/0365175 A1 | 12/2015 | Kawamura et al. | |
| 2015/0365176 A1* | 12/2015 | Kawamura | H04B 10/676 |
| | | | 29/825 |
| 2016/0170145 A1* | 6/2016 | Kawamura | G02B 6/4261 |
| | | | 250/226 |
| 2017/0134099 A1 | 5/2017 | Hara et al. | |
| 2017/0212232 A1 | 7/2017 | Fujioka | |

\* cited by examiner

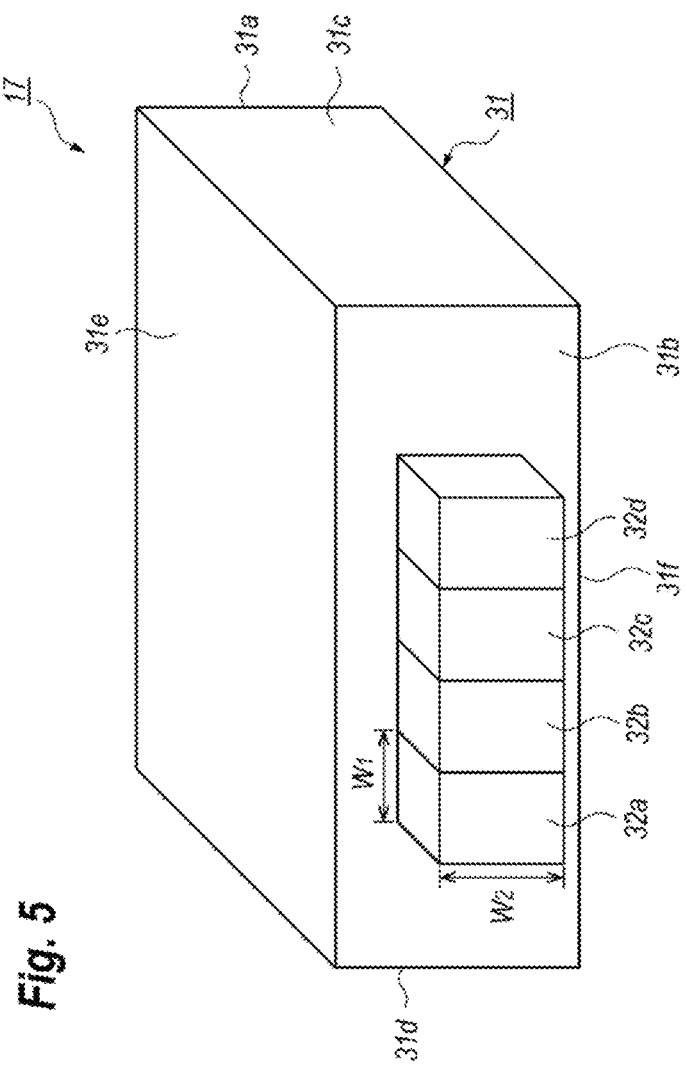

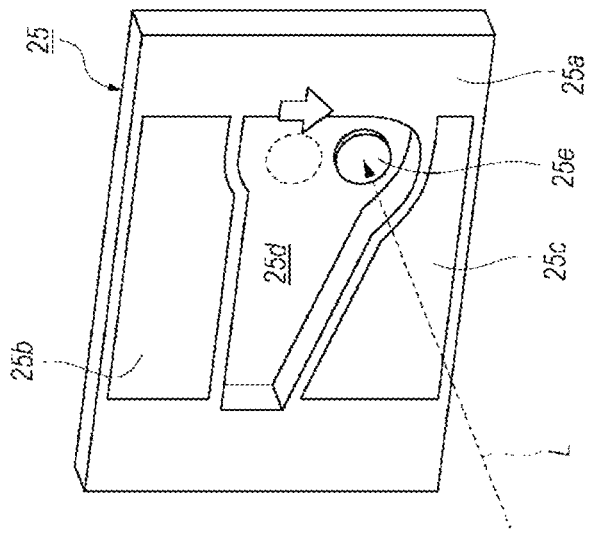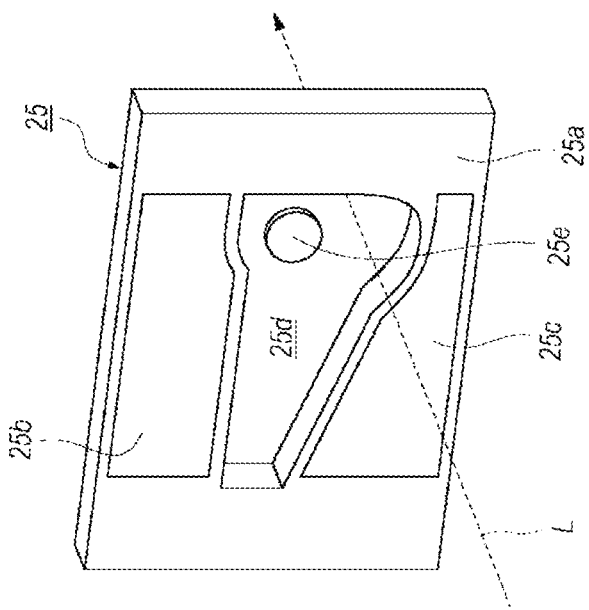

RECEIVER OPTICAL MODULE IMPLEMENTING OPTICAL ATTENUATOR

CROSS REFERENCE TO RELATED APPLICATIONS

The present application is based on and claims benefits of priority of Japanese Patent Applications Nos. 2017-128769, 2017-128770, and 2018-033778, where former two were filed on Jun. 30, 2017, while the last one was filed on Feb. 27, 2018; entire contents of which are incorporated herein by references.

BACKGROUND OF INVENTION

1. Field of Invention

The present invention relates to a receiver optical module, in particular, the invention relates to a receiver optical module that receives a wavelength multiplexed signal and recovers a plurality of information contained in optical signals in the wavelength multiplexed signal by de-multiplexing it.

2. Background Arts

A wavelength division multiplexing (WDM) communication recently becomes popular as an amount of information to be transmitted becomes huge, where the WDM signal implemented therein multiplexes a plurality of optical signals each having specific wavelengths different from each other. In the WDM communication, an optical de-multiplexer may de-multiplex the wavelength multiplexed signal into a plurality of optical signals and photodiodes (PDs) also implemented in the WDM communication system may receive the optical signals. A Japanese Patent document laid open No. JP-2013-125045A, a counter part of which in the United States is published by US2013-148970A, has disclosed a receiver optical module having the function above described.

When a receiver optical module receives an optical signal with excess power, a PD or an electronic circuit processing an electrical signal converted by the PD possibly recovers infatuation contained in the optical signal erroneously. Accordingly, a receiver optical module generally implements an optical attenuator, or a variable optical attenuator (VOA), in a front end thereof. When an optical signal to be received in a receiver optical module is a type of WDM signal, a VOA sometimes degrades isolation between the optical signals, or causes uneven attenuation between the optical signals, which possibly increases an error rate of the communication.

SUMMARY OF INVENTION

An aspect of the present invention relates to a receiver optical module that comprises a coupling unit, an optical de-multiplexer, and an optical attenuator. The coupling unit receives an optical fiber that provides a wavelength multiplexed signal multiplexing optical signals each having a wavelength specific thereto and different from each other. The optical de-multiplexer optically couples with the optical fiber and de-multiplexes the wavelength multiplexed signal provided from the optical fiber. The optical de-multiplexer provides a plurality of multi-layered dielectric films each passing one of the respective optical signals but reflecting other of the optical signals. The multi-layered dielectric films have a rectangular plane shape with a longer side and a shorter side. The optical attenuator is provided between the coupling unit and the optical de-multiplexer. The optical attenuator attenuates the wavelength multiplexed signal and has a shutter that is movable along the longer side of the multi-layered dielectric film.

BRIEF DESCRIPTION OF THE DRAWINGS

The foregoing and other purposes, aspects and advantages will be better understood from the following detailed description of a preferred embodiment of the invention with reference to the drawings, in which:

FIG. 5 shows an outer shape of an optical de-multiplexer installed within the receiver optical module shown in FIG. 1;

FIG. 6A and FIG. 6B show perspective views of a variable optical attenuator (VOA) implemented in the receiver optical module shown in FIG. 1;

DESCRIPTION OF EMBODIMENTS

Next, some embodiments according to the present invention will be described as referring to accompany drawings.

The present invention, however, is not restricted to those embodiments, and has a scope defined in claims and includes all changes, modifications and equivalents derived from the scope of the claims. In the explanations of drawings, numerals or symbols will refer to elements same with or similar to each other without overlapping explanations.

Figure 1:
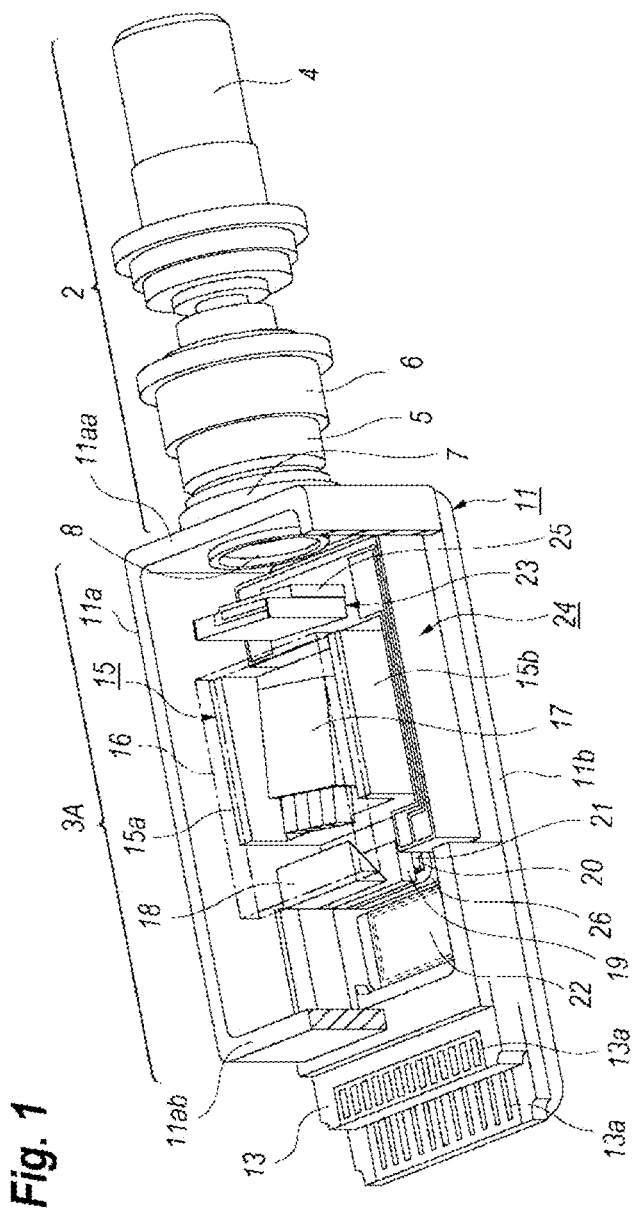
FIG. 1 is a perspective view showing a receiver optical module according to an embodiment of the present invention.
Figure 2:
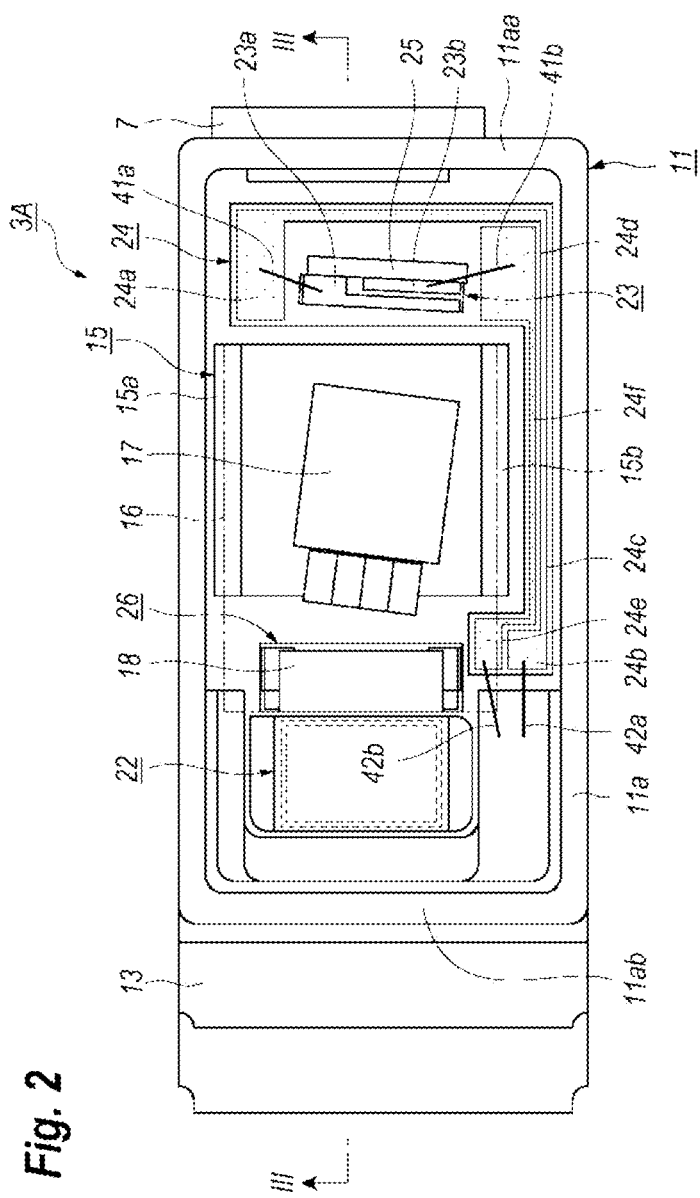
FIG. 2 shows an inside of a body unit of the receiver optical module according to an embodiment of the present invention.
Figure 3:
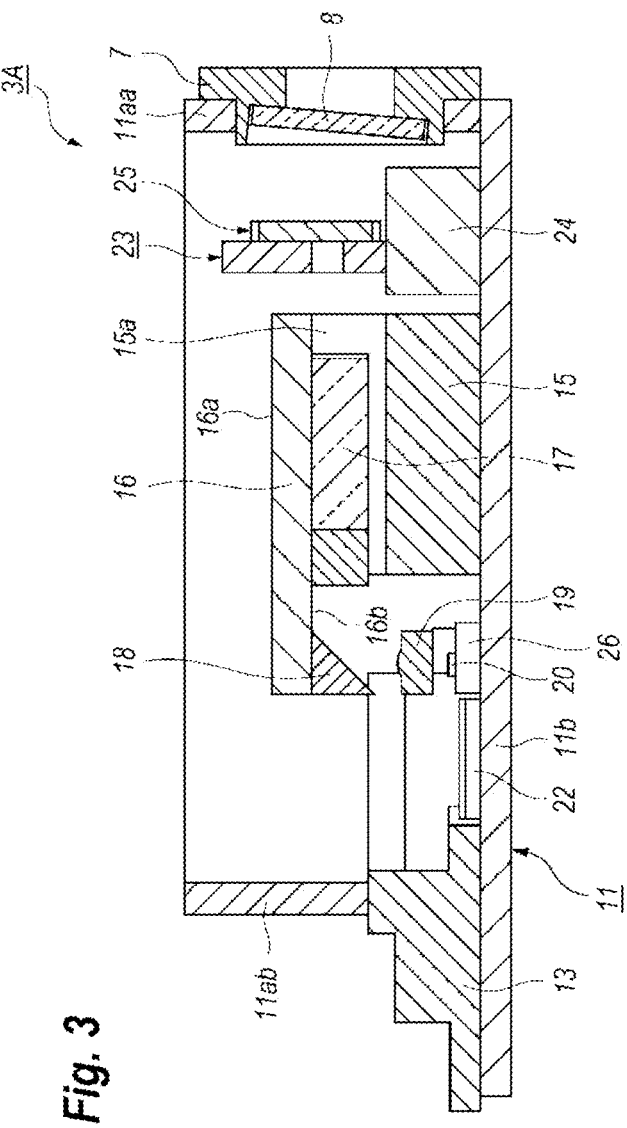
FIG. 3 shows a cross section of the receiver optical module taken along a line III-III indicated in FIG. 2.

FIG. 1 is a perspective view showing a receiver optical module 1A according to one embodiment of the present invention, where FIG. 1 partially removes a lid and a side wall to show an inside of a body unit 3A; FIG. 2 is a plan view showing an inside of the body unit 3A; and FIG. 3 shows a cross section of the body unit 3A taken along the line III-III indicated in FIG. 2. The receiver optical module 1A, which is to be implemented within an optical transceiver as a receiver optical subassembly (ROSA), provides a coupling unit 2 and the body unit 3A.

The body unit 3A includes a box-shaped housing 11 having a side wall 11a and a bottom 11b. The bottom 11b, which has a rectangular slab shape, may be made of metal such as alloy of copper and molybdenum (CuMo), copper and tungsten (CuW), and so on. The bottom 11b preferably has substantial thermal conductivity to enhance heat dissipation externally. The side wall 11a, which has a frame shape, is arranged along peripheries of the bottom 11b. The side wall 11a disposes a pair of walls, 11aa and 11ab, along a longitudinal direction of the body unit 3A, where the former wall 11aa will be called as a front wall, while, the latter will be called as a rear wall. However, definitions of the "front" and the "rear" are only for the explanation sake, and will not affect a scope of the present invention. The side wall 11a arranges the lid, which is not shown in figures, thereon. Thus, the lid, the side wall, and the bottom form a space that is air-tightly shielded, into which electrical and optical components of the receiver optical module 1A are enclosed.

The coupling unit 2, which has a cylindrical shape extending along the longitudinal direction of the body unit 3A from the front wall 11aa, provides, from the front to the rear, a sleeve 4 in an end thereof, a joint sleeve 5, and a lens holder 6 attached to the front wall 11aa. The sleeve 4, which includes a stub in a side of the body unit 3A, receives a ferrule secured in a tip end of an optical fiber in a front end thereof. The optical fiber is to be optically coupled with the coupling fiber in the stub. The joint sleeve 5 enables optical alignment between the sleeve 4, exactly, the optical fiber received in the sleeve 4, and optical components enclosed with therein the body unit 3A. The lens holder 6 holds a lens that converts an optical signal provided from the coupling fiber of the stub in the sleeve 4, exactly from the optical fiber, into substantially collimated beam. The bush 7 arranges a window that passes the wavelength multiplexed signal therethrough and air-tightly shields the space in the body unit 3A from an outside.

The body unit 3A also provides a feedthrough 13, a support 15, a carrier 16, an optical de-multiplexer 17, a mirror 18, a lens array 19, a photodiode (PD) 20, a pre-amplifier 22, a variable optical attenuator (VOA) 25, and a wiring substrate 24 therein. Those components except for the feedthrough 13 are enclosed in the space of the housing 11.

The feedthrough 13, which may be made of multi-layered ceramics, is arranged in the rear wall 1 lab and performs an electrical connection with the outside. The feedthrough 13 provides terminals 13a to be connected with an external circuit in an outer portion thereof and other terminals electrically connected with the pre-amplifier 22 and the VOA 25 in an inner portion thereof. The former terminals 13a are connected with the inner terminals through interconnections buried within the multi-layered ceramics.

The VOA 25, which may attenuate the wavelength multiplexed signal provided from the optical fiber, is disposed between the optical fiber and the optical de-multiplexer 17, specifically, just behind of the coupling unit 2. The VOA 25 in the attenuation thereof may be electrically controlled by a control signal provided from an outside of the receiver optical module 1A. The present embodiment mounts the VOA 25 on the wiring substrate 24 through a VOA carrier 23; specifically, the wiring substrate 24 is placed on the bottom 11b of the housing 11 and provides a portion disposed between the support 15 and bush 7. The VOA carrier 23, which has a slab shape with one side facing the window 8, is mounted on the wiring substrate 24. The VOA 25 is attached to this side of the VOA carrier 23. Thus, the VOA 25 is optically coupled with the window 8 and receives the wavelength multiplexed signal passing the windows 8. Details of the VOA 25 will be described later in the specification.

The optical de-multiplexer 17, which optically couples with the optical fiber through the VOA 25, may de-multiplex the wavelength multiplexed signal into optical signals each having a wavelength different from each other. The optical de-multiplexer 17 is mounted on the carrier 16. Specifically, the carrier 16, which has a slab shape extending parallel to the bottom 11b of the housing 11, provides a back surface 16b facing the bottom 11b and a top surface 16a opposite to the back surface 16b. The back surface 11b mounts the optical de-multiplexer 17 thereon with an adhesive. The carrier 16 may be made of ceramics, such as aluminum oxide (Al2O3).

The carrier 16 is mounted on the support 15, that is, the support 15, which is provided between the carrier 16 in the back surface 16b thereof and the bottom 11b of housing 11, supports the back surface 16b of the carrier 16. The support 15 provides a pair of side walls, 15a and 15b, in respective lateral edges that extend along a longitudinal direction of the housing 11, where the side walls, 15a and 15b, support respective sides of the carrier 16. The side walls, 15a and 15b, and the carrier 16 may form a cavity between the back surface 16b of the carrier 16 and the support 15, where the optical de-multiplexer 17 is disposed therein. The support 15 may be made of material having thermal expansion coefficient closer to that of the carrier 16, typically, made of aluminum oxide (Al2O3), aluminum nitride (AlN), copper molybdenum (CuMo), copper tungsten (CuW), and so on.

The carrier 16 in the back surface 16b mounts the mirror 18 also with an adhesive. The mirror 18 may reflect the optical signals that are de-multiplexed from the wavelength multiplexed signal by the optical de-multiplexer 17 toward the photodiode (PD) 20. In the present embodiment, the PD 20, which is disposed on the bottom 11b of the housing 11, includes PD elements that are arranged along the longitudinal direction of the mirror, that is, along a direction parallel to the lateral direction of the housing 11. The mirror 18 may be a type of prism mirror.

The lens array 19, which is disposed between the PD 20 and the mirror 18, provides convex lens elements corresponding to the optical signals and the PD elements in the PD 20. That is, one convex lens element may concentrate one of the optical signals onto the one of the PD elements. The lens array 19 is assembled with the PD 20 and mounted on the bottom 11b of the housing 11 through a sub-mount 26.

The PD 20, which is mounted on the bottom 11b of the housing 11 through the sub-mount 26, converts the optical signals to electrical signals. The PD 20 in the respective PD elements thereof optically couples with the optical de-multiplexer 17 through the mirror 18 and the lens array 19; while, the PD elements in the PD 20 are electrically connected with pre-amplifier 22 that includes trans-impedance amplifiers each corresponding to the PD elements and is disposed behind the PD 20, specifically, the pre-amplifier 22 is placed between the PD 20 and the feedthrough 13. The trans-impedance amplifiers in the pre-amplifier 22 convert photocurrents output from the PD elements into voltage signals and amplify the voltage signals to provide the amplified signals outside of the receiver optical module 1A.

Figure 4:
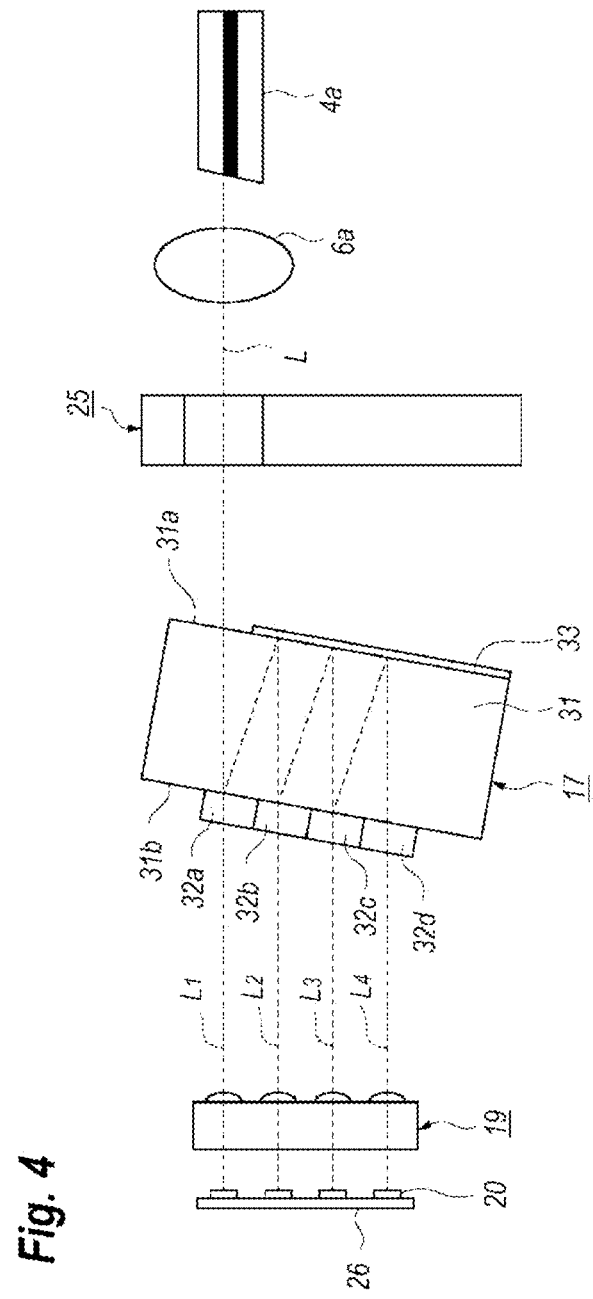
FIG. 4 schematically shows an optical de-multiplexing function implemented in the receiver optical module shown in FIG. 1.

Functions of the optical de-multiplexer 17 will be described as referring to FIG. 4 that schematically illustrates an optical coupling system in the receiver optical module 1A. The wavelength multiplexed optical signal L enters within the receiver optical module 1A by coupling the optical fiber that transmits the wavelength multiplexed signal with the sleeve 4 that provides the coupling fiber 4a. The wavelength multiplexed signal L as already described multiplexes a plurality of optical signals, where the wavelength multiplexed signal L in the present embodiment multiplexes four optical signals, each having a wavelength specific thereto and different from each other. The lens 6a may collimate the wavelength multiplexed signal L; exactly, the beam L output from the lens 6a does not become a collimated beam because the coupling fiber 4a in a tip end thereof has a substantial dimension and may not behave as a point source. Thus, the wavelength multiplexed beam L output from the lens 6a forms a beam waist. The VOA 25 may attenuate the wavelength multiplexed signal L output form the lens 6a.

The optical de-multiplexer 17 includes a body 31, a plurality of, four in the present embodiment, multi-layered dielectric films, 32a to 32d, and a reflection film 33. The body 31 has front and rear sides, 31a and 31b, where the beam L enters the body 31 through the front side 31a. The front side 31a and the rear side 31b extend in parallel to each other but make a substantial angle against an optical axis of the beam L, that is, the front and rear sides, 31a and 31b, in normal thereof are inclined with the optical axis. The front side 31a provides the reflection film 33, while, the rear side 31b attaches the multi-layered dielectric films, 32a to 32b. The multi-layered dielectric films, 32a to 32d, may selectively transmit one of the optical signals contained in the wavelength multiplexed signal L but reflect other of the optical signals. The reflection film 33 may reflect all of the optical signals.

Assuming that the wavelength multiplexed signal L contains four optical signals each having a wavelength of λ1, λ2, λ3, or λ4 with a relation of λ1>λ2>λ3>λ4; the first dielectric film 32a only transmits the optical signal with the wavelength of λ1 but reflect other optical signals with the wavelengths of λ2 to λ4. The reflection film 33 may reflect these other optical signals toward the second dielectric film 32b. The second dielectric film 32b may transmit only the optical signal with the wavelength of λ2 but reflects other two optical signals with the wavelengths of λ3 and λ4 toward the reflection film 33. The reflection film 33 may reflect the other two optical signals toward the third dielectric film 32c. The third dielectric film 32c may transmit only the optical signal with the wavelength of λ3; but reflect the rest optical signal with the wavelength of λ4 toward the reflection film 33. This last optical signal is reflected by the reflection film 33 toward the fourth dielectric film 32d and transmits the fourth dielectric film 32d. Thus, receiving the wavelength multiplexed signal L, the wavelength de-multiplexer 17 may output the four optical signals, λ1 to λ4, from respective positions physically apart from each other on the rear side 31b. The de-multiplexed optical signals each having the wavelength, λ1, λ2, λ3, or λ4, are reflected by the mirror 18, concentrated on the PD elements, and received by the PD elements.

FIG. 5 is a perspective view showing the optical de-multiplexer 17. The body 31, which may be made of material transparent for the optical signals, has a shape of a parallelepiped having, in addition to the front and rear sides, 31a and 31b, two sides, 31c and 31d, opposite to each other and connecting the front side 31a with the rear side 31b, and a top and bottom surfaces, 31e and 31f, opposite to each other. The top surface 31e faces to the carrier 16 and attached to the back surface 16b thereof with an adhesive. The multi-layered dielectric films, 32a to 32d, as described above, are attached to the rear side 31b of the body 31 along the lateral direction thereof connecting the two sides, 31c and 32d; while the vertical direction connects the top 31e with the bottom 31f. The multi-layered dielectric films, 32a to 32d, have shorter sides each having a width W1 along the lateral direction and longer sides each having a width W2 along the vertical direction, where the former is, for instance, 500 to 750 μm while the latter is, for instance, 1 mm.

FIG. 6A and FIG. 6B are perspective views of the VOA 25. The VOA 25 of the present embodiment provides a base 25a with a rectangular slab, a pair of terminals, 25b and 25c, on the base 25a and a shutter 25e disposed within an aperture 25d provided in the base 25a. The shutter 25e has a circular shape with a diameter of greater than a field diameter of the wavelength multiplexed signal L but at most twice of the field diameter thereof. The base 25a is disposed within the housing 11 such that the aperture 25d passes the wavelength multiplexed signal L but blocks the beam by the shutter 25e. Specifically, the shutter 25e is movable up and down within the aperture 25d depending on static charges generated by a control signal applied between the terminals, 25b and 25c. FIG. 6A shows a status where the shutter 25e is apart from the optical axis of the wavelength multiplexed signal L, that is, the beam is free from the shutter 25e; while, FIG. 6B shows a status where the shutter 25e fully blocks the wavelength multiplexed signal L, namely, the shutter 25 causes the maximum attenuation. The control signal may set the shutter in a position between those of FIG. 6A and FIG. 6B depending on the attenuation.

Figure 16A:
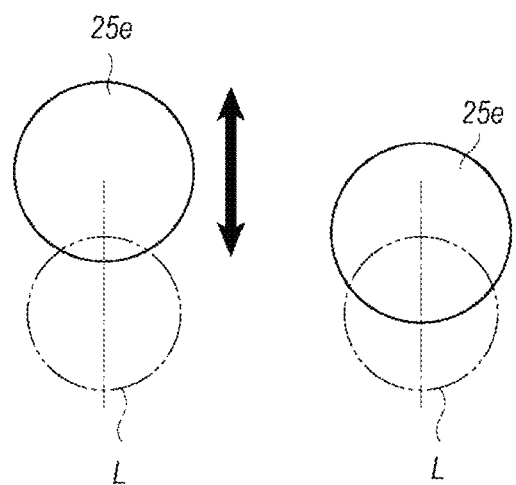
FIG. 16A and FIG. 16B schematically illustrate positional relations between the shutter in the VOA and the wavelength multiplexed signal L of an embodiment of the present invention and of a conventional one, respectively.
Figure 16B:
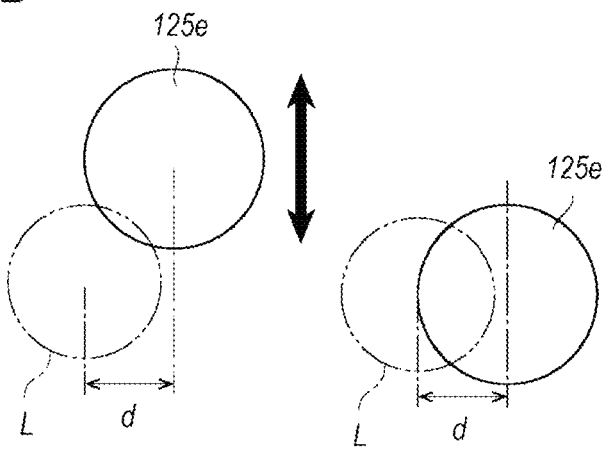

When a shutter 125e is horizontally offset from the wavelength multiplexed signal L by a distance d that is greater than a radius of the shutter 125e as shown in FIG. 16B, the shutter 125e becomes unable to fully block the wavelength multiplexed signal L even the shutter 125e moves vertically; then, the wavelength multiplexed signal L may leak from the VOA 25. On the other hand, the VOA of the present embodiment 25 aligns the position of the shutter 25e thereof vertically with the wavelength multiplexed signal L, as shown in FIG. 16A. Accordingly, the shutter 25e may fully block the wavelength multiplexed signal L by moving vertically.

The VOA carrier 23 provides on a top surface thereof pads, interconnections corresponding to the terminals, 25b and 25c, in the base 25. Mounting the base 25a on the VOA carrier 23, the interconnections are electrically connected with the terminals, 25b and 25c. The interconnections on the VOA carrier 23 each provide pads, 23a and 23b, on the top side thereof to which bonding wires, 41a and 41b, are bonded from pads, 24a and 24d, on the wiring substrate 24. Thus, the terminals, 25a and 25b, may be electrically connected with terminals on the feedthrough 13 through the interconnections and the pads, 23a and 23b, on the base 23, the bonding wires, 41a and 41b, the interconnections, 24c and 24f, on the wiring substrate 24, pads, 24b and 24e, provided in respective ends of the interconnections, 24c and 24f; other bonding wires, 42a and 42b, connecting the pads, 24b and 24e, on the wiring substrate 24 with terminals on the feedthrough 13.

Next, advantageous functions according to the receiver optical module 1A of the present embodiment will be explained. When the wavelength de-multiplexing is roughly done by the optical de-multiplexer 17, or done with a large tolerance, a PD element possibly receives not only the optical signal corresponding thereto but other optical signals that should be detected by PD elements arranged next to the subject PD element, which degrades the isolation between the channels.

A multi-layered dielectric film inherently causes internal stresses due to differences in thermal expansion coefficients between the layers. The stresses thus induced in the multi-layered dielectric films may slightly bend the film. In particular, when the multi-layered dielectric film is bent, edges or peripheries of the dielectric film may show large discrepancies in angles against the optical axis thereof, which means that the edges or the peripheries in the multi-layered dielectric film degrades the preciseness in the optical de-multiplexing. Accordingly, the wavelength multiplexed signal L is necessary to enter the dielectric films, 32a to 32d, in center portions by adjusting relative positions between the optical fiber 4a and the optical de-multiplexer 17. However, when a receiver optical module provides a VOA 25 with a movable shutter 25e upstream the optical de-multiplexer 17, the shutter 25e in edges thereof may diffract the wavelength multiplexed signal L and disarranges the collimation of the beam L.

FIG. 7A to FIG. 8B show diffractions of the wavelength multiplexed signal L when the shutter 25e in the VOA moves by 150, 200, 250, and 300 μm from a center of the wavelength multiplexed signal L. Horizontal axes correspond to positions of the shutter 25e along the lateral direction, while, vertical axes denote positions along the vertical direction, namely, normal to the bottom 11b of the housing 11. FIG. 7A to FIG. 8B correspond to positions of the shutter 25e in the center thereof moves by 150, 200, 250, and 300 μm, respectively, from the center of the wavelength multiplexed optical signal L. The shutter 25e, as shown in FIG. 6A and FIG. 6B, has a circular shape with a diameter of about 300 μm.

Figure 7A:
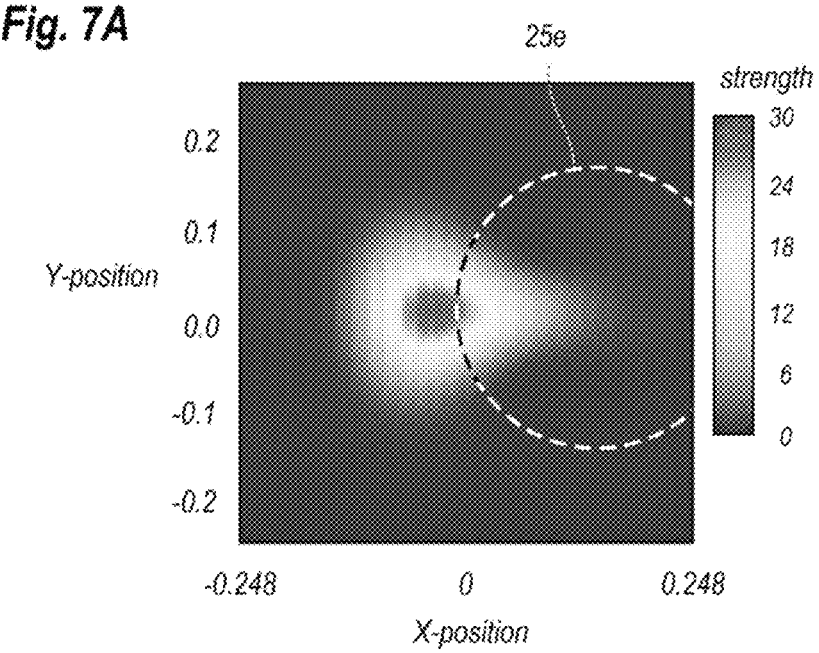
FIG. 7A and FIG. 7B show diffractions of the wavelength multiplexed signal when a shutter in the VOA moves by 150 and 200 μm from a center of the optical axis of the wavelength multiplexed signal.
Figure 7B:
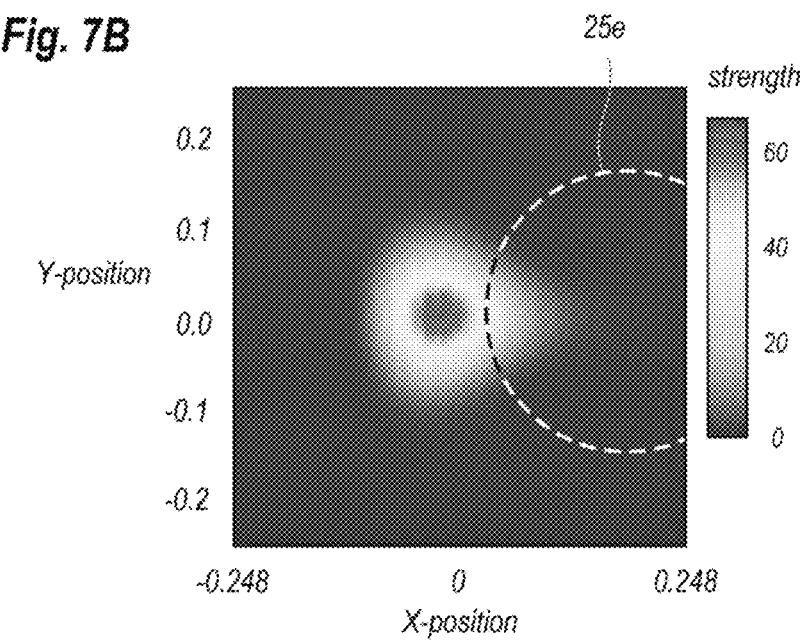
Figure 8A:
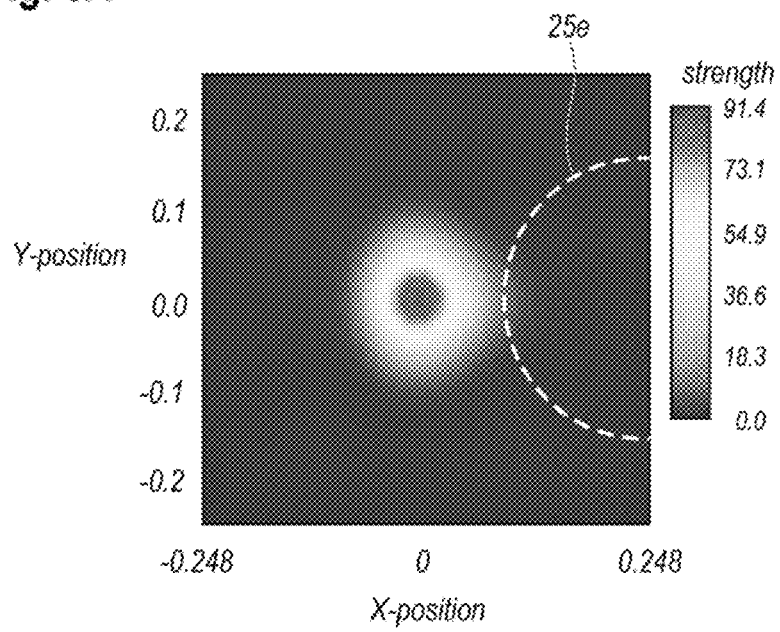
FIG. 8A and FIG. 8B show diffractions of the wavelength multiplexed signal when the shutter moves by 250 and 300 μm, respectively, from the center of the optical axis of the wavelength multiplexed signal.
Figure 8B:
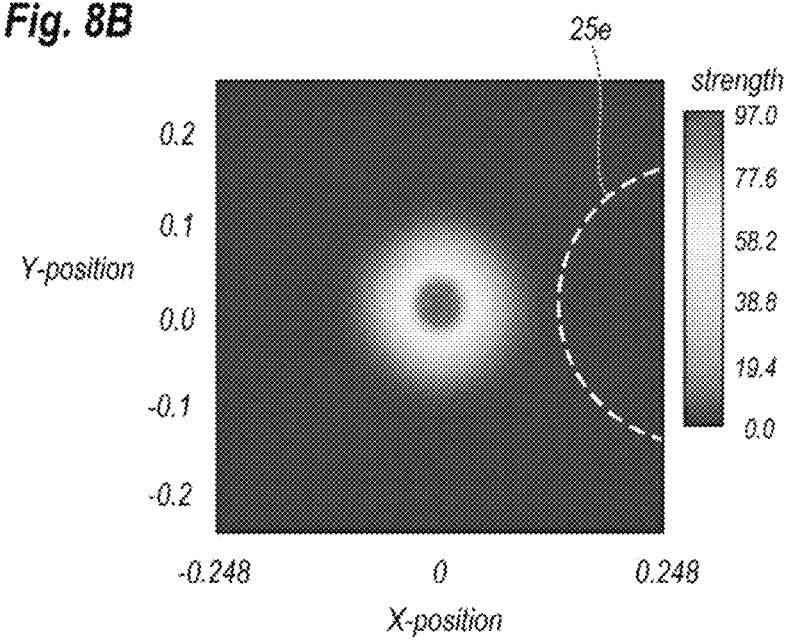

As the optical signal L in the center thereof becomes closer to the center of the shutter 25e, the diffraction of the beam L become greater, and a field diameter of the beam L along the lateral direction becomes larger. When the optical signal L with a filed pattern expanding along the lateral direction as shown in FIG. 7A where the shutter 25e in a large portion thereof overlaps with the optical signal L enters the multi-layered dielectric films, 32a to 32d, in particular, enters the peripheries of the multi-layered dielectric films, 32a to 32d, the preciseness of the wavelength de-multiplexing becomes degraded.

The receiver optical module 1A of the present embodiment vertically moves shutter 25e, that is, the shutter 25e makes an action along the vertical direction of the multi-layered dielectric films, 32a to 32d, connecting the top surface 31e with the bottom surface 31f of the base 31 of the optical de-multiplexer 17, that is, along the longer sides of the multi-layered dielectric films, 32a to 32d. When the multi-layered dielectric films, 32a to 32d, have a shape of rectangular with the longer sides perpendicular to the bottom 11b of the housing 11 and the shorter sides parallel to the bottom 11b, and the shutter 25e makes the horizontal action parallel to the bottom 11b, the beam diffracted by edges of the shutter 25e horizontally spreads along the shorter sides of the dielectric films, 32a to 32d. On the other hand, when the shutter 25e makes a vertical action perpendicular to the bottom 11b of the housing 11, the beam diffracted by the edges of the shutter 25e vertically spreads along the longer sides of the multi-layered dielectric films, 32a to 32d, but leaves substantial spaces against the shorter edges of the multi-layered dielectric films, 32a to 32d. Accordingly, the multi-layered dielectric films, 32a to 32d, may securely show the function of the optical de-multiplexing and maintain enough isolation between the optical signals, L1 to L4, de-multiplexed by the optical de-multiplexer 17.

Figure 9:
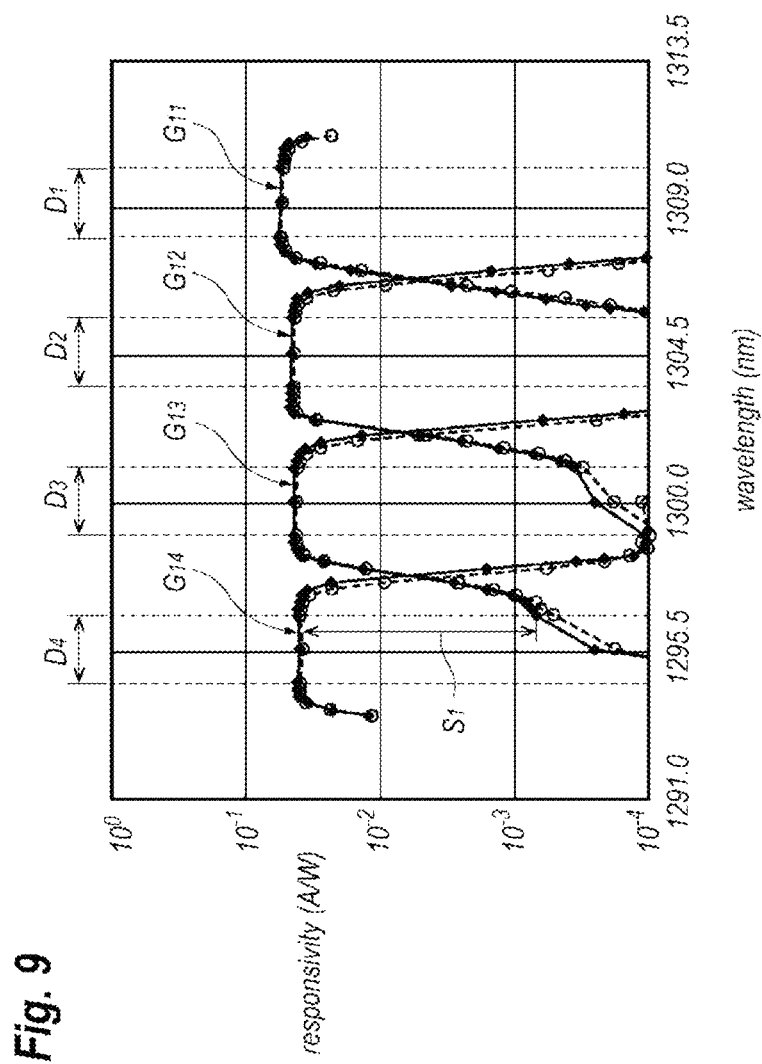
FIG. 9 shows isolation between optical signals for the VOA with measured through photodiode (PD) elements for the arrangement corresponding to the diffraction shown in FIG. 7A and FIG. 7B.
Figure 10:
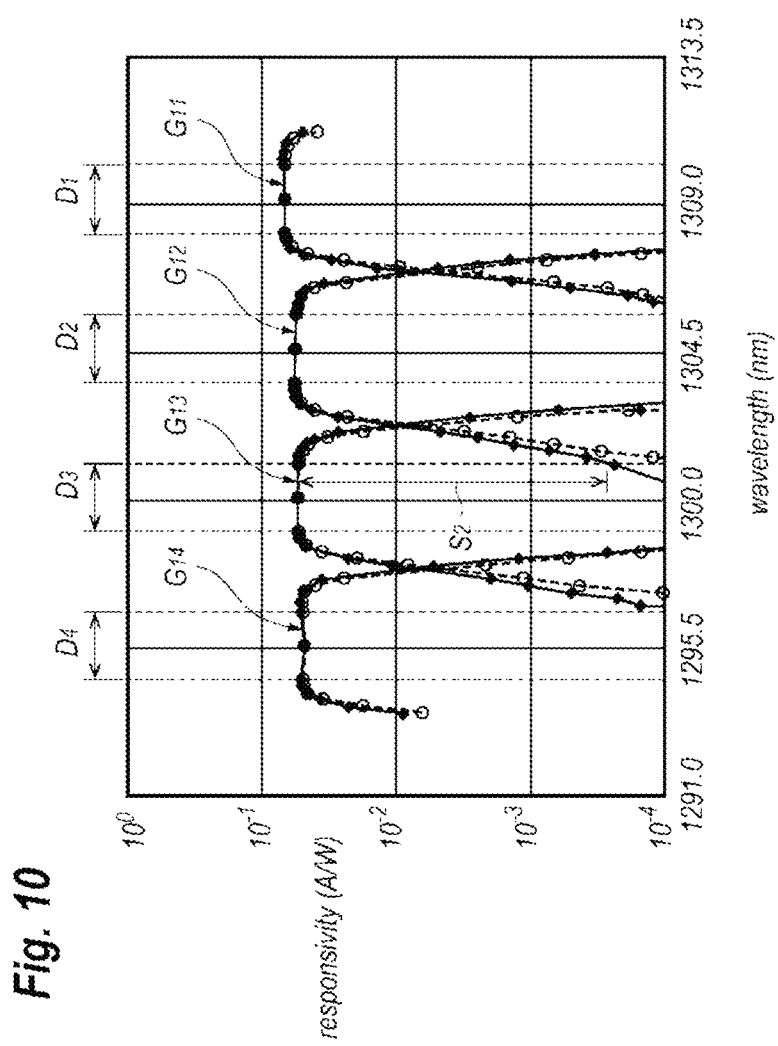
FIG. 10 shows isolation between optical signals for the VOA in the arrangement of the shutter corresponding to the diffraction shown in FIG. 8A and FIG. 8B.

FIG. 9 and FIG. 10 show output behaviors of the PD elements, which correspond to the transmittance of the multi-layered dielectric films, 32a to 32d, that are called as the responsivity; where FIG. 9 is the responsivity of the PD elements when the shutter 25e makes the horizontal action, that is, the beam diffracted by the shutter 25e spreads horizontally along the shorter sides of the dielectric films; while, FIG. 10 shows the responsivity of the PD elements when the shutter 25e makes the vertical action. In FIG. 9 and FIG. 10, the horizontal axis corresponds to the wavelength, while, the vertical axis shows the responsivity. Also in those figures, behaviors, G11 to G14, correspond to the transmittance of the dielectric films, 32a to 32d, and solid lines show the transmittance for a wavelength multiplexed signal L with the P polarization, namely, the beam has the polarization parallel to the bottom 11b of the housing 11, while, broken lines show those for a wavelength multiplexed signal L with the S polarization that is perpendicular to the bottom 11b. Symbols, D1 to D4, show wavelength regions of the respective optical signals, L1 to L4, de-multiplexed by the optical de-multiplexer 17. The shutter 25e has a diameter of about 300 μm, and the wavelength multiplexed signal L has a field diameter of 250 μm.

When the shutter 25e makes the horizontal action, the spectra, G12 and G13, for the optical signals, L2 and L3, leave substantial responsivity in shorter wavelengths, specifically, the behaviors, G12 and G13, show the responsivity greater than $10^{-4}$ in the wavelength regions, D3 and D4, respectively. Although not illustrated in FIG. 8A and FIG. 8B, the behavior G14 for the fourth optical signal may cause further greater responsivity in shorter wavelengths. The isolation S1 between the fourth optical signal and the third optical signal in the wavelength region for the fourth optical signal D4 becomes about 17.7 dB. A reason why a residual responsivity is left in shorter wavelengths is seemed that the incident angles of the wavelength multiplexed signal L for the multi-layered dielectric films, 32b to 32d, become greater because of bends of the films.

On the other hand, when the shutter 25e is operated vertically in the present embodiment, the residual responsivity in shorter wavelengths is considerably eliminated as shown in spectra, D2 and D3, in FIG. 10, which may enhance the isolation S2 between the regions, D2 and D3, to be 23.5 dB. Thus, the arrangement of the shutter 25e against the multi-layered dielectric films, 32a to 32d, may enhance the isolation between the wavelength regions.

Also, the optical de-multiplexer 17 of the present embodiment provides the body 31 transparent for the wavelength multiplexed signal L where the body includes the front and rear sides, 31a and 31b, extending in parallel to each other, where the front side 31a provides the reflection film 33 while the rear side 31b provides the multi-layered dielectric films, 32a to 32d, along the edge between the rear side 31b and the top or bottom surface, 31e or 31f. When the wavelength multiplexed signal L enters the body 31, the optical signals, L1 to L4, may transmit the respective multi-layered dielectric films, 32a to 32d, iterating the reflection between the front and rear sides, 31a and 31b, which may de-multiplex the wavelength multiplexed signal L into the respective optical signals, L1 to L4. The multi-layered dielectric films, 32a to 32d, arranged side by side along the lateral direction thereof, which is shorter than the longitudinal direction thereof, may make the body 31 compact, and also the receiver optical module 1A itself.

Figure 11:
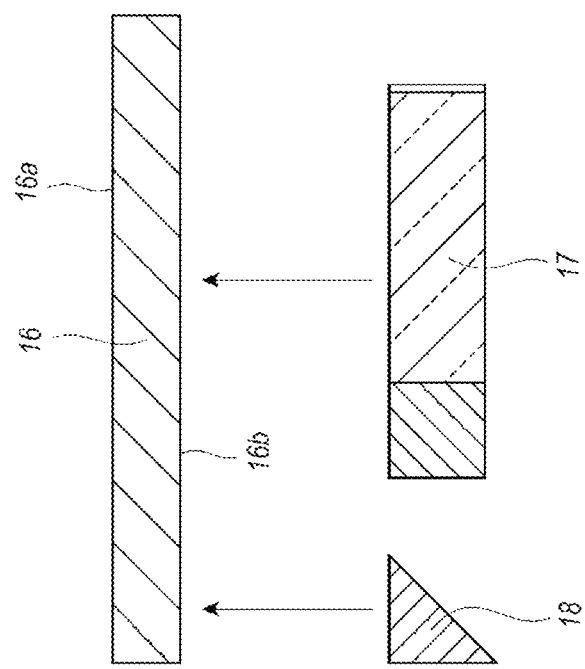
FIG. 11 shows a step in a process of assembling a body unit of the receiver optical module shown in FIG. 1.
Figure 12:
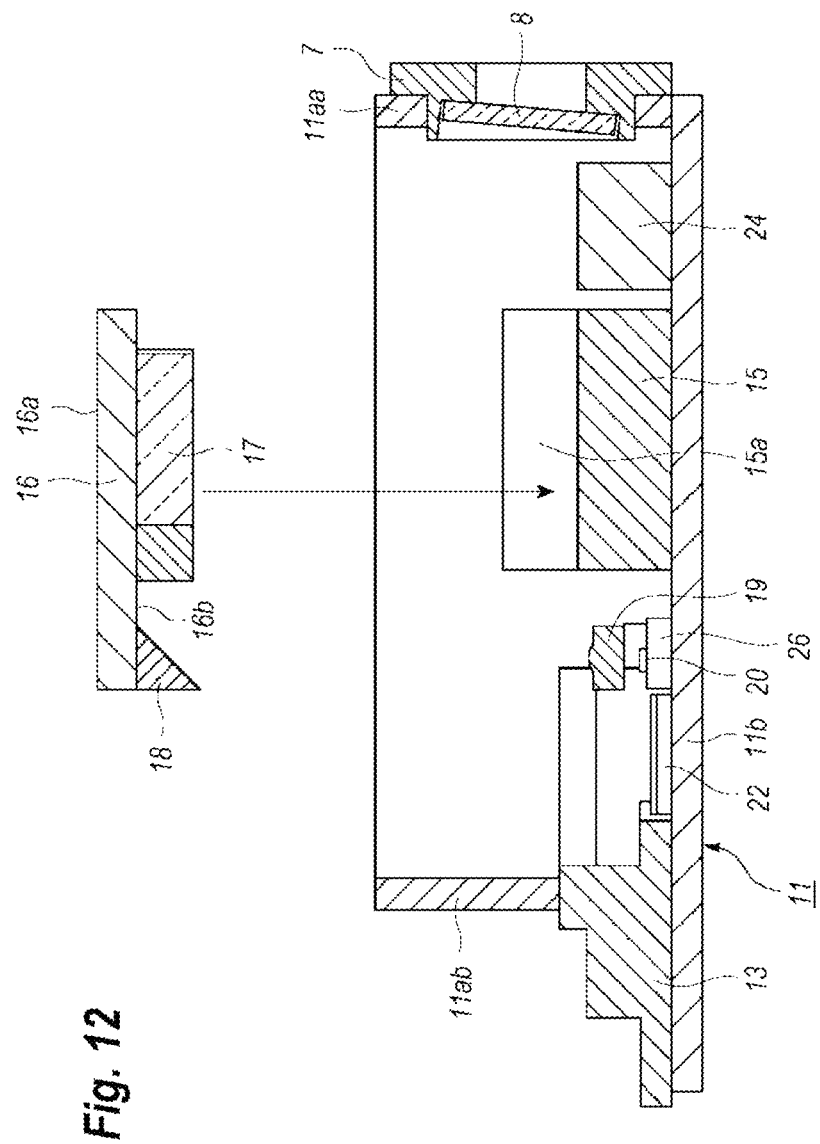
FIG. 12 shows a step of the process of assembling a body unit of the receiver optical module shown in FIG. 1, where the step shown in FIG. 12 is subsequent to the step shown in FIG. 11.
Figure 13:
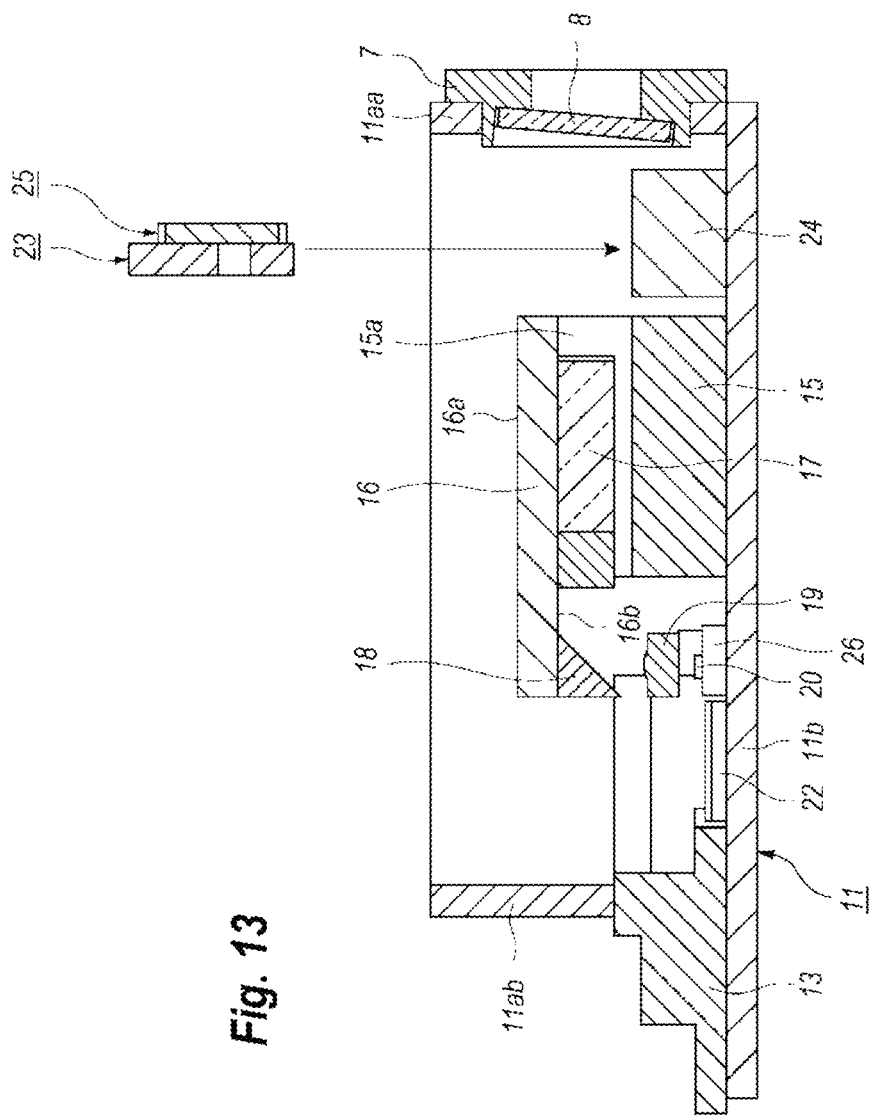
FIG. 13 shows a step of the process of assembling a body unit of the receiver optical module shown in FIG. 1, where the step shown in FIG. 13 is subsequent to the step shown in FIG. 12.

Next, a process of assembling the receiver optical module 1A will be described as referring to FIG. 11 to FIG. 13. First, the carrier 16 mounts the optical de-multiplexer 17 and the mirror 18 on the back surface 16b thereof. The back surface 16b provides positional indices for the optical de-multiplexer 17 and the mirror 18. Then, as shown in FIG. 12, the carrier 16 that mounts the optical de-multiplexer 17 and the mirror 18 is disposed on the side walls, 15a and 15b, of the support 15. In this step, the carrier 16 may be aligned in the incident angle thereof for the wavelength multiplexed signal L such that the optical signals, L1 to L4, de-multiplexed thereby enter the respective PD elements in the PD 20. Thereafter, as shown in FIG. 13, the VOA 25 is mounted on the wiring substrate 24.

Next, electrical connection in the receiver optical module 1A, in particular, between the VOA 25 and the feedthrough 13, will be described as referring back to FIG. 2. One of interconnections from the VOA 25 to the feedthrough 13 includes an interconnections 24c providing in an outer side on the wiring substrate 24, a pad 24b providing in another end of the inter connection 24c, and a bonding wire 42a connecting the pad 24b with the feedthrough 13 in addition to the pad 23a on the VOA carrier 23, the pad 24a on the wiring substrate 24, and the bonding wire 41a connecting the pad 23a with the pad 24a. The other of the interconnection includes an interconnection 24f running inner side on the wiring substrate 24, a pad 24e provided on an end of the interconnection 24f, and a bonding wire 42b connecting the pad 24e with the feedthrough 13 in addition to the pad 23b on the VOA carrier 23, the pad 24d on the wiring substrate 24, and the bonding wire 41b connecting the pad 23b with the pad 24d.

The pads, 24a, 24b, 24d, and 24e, and the interconnections, 24c and 24f, may be made of metal or stacked metals, including gold (Au). The wiring substrate 24 provides a front portion that is disposed between the support 15 and the front wall 11aa, an intermediate portion, and a rear portion. The intermediate portion is disposed between the side wall 11a and the support 15, and has a width along the lateral direction of the housing 11 narrower than a width of the rear portion. The rear portion, which is disposed between the support 15 and the feedthrough 13, faces the feedthrough 13. Thus, the wiring substrate 24 in a plane shape thereof has a C-character. The front portion mounts the VOA 25 through the VOA carrier 23 and provides the pads, 24a and 24b; while, the rear portion provides the other pads, 24b and 24e, thereon.

The receiver optical module 1A thus configured de-multiplexes the wavelength multiplexed signal L provided from the optical fiber 4a received in the coupling unit 2 after being attenuated by the VOA 25. The attenuation in the VOA 25 may be controlled, or adjusted, by electrical signals externally provided to the terminals, 25a and 25b, through the feedthrough 13 and the interconnections, 24c and 24f, on the wiring substrate 24. The optical signals, L1 to L4, de-multiplexed by the optical de-multiplexer 17 may be converted into the respective electrical signals by the PD elements in the PD 20, then externally output from the feedthrough 13 through the pre-amplifier 22. Moreover, the wiring substrate 24 has the front portion, the intermediate portion, and the rear portion, where the intermediate portion extends longitudinally in the housing 11 is arranged in side by side with respect to the support 15 and the front portion mounts the VOA 25 through the VOA carrier 23 thereon. This arrangement of the wiring substrate 24 may electrically connect the VOA 25 with the feedthrough within the housing 11 formed in compact.

Second Embodiment

Figure 14:
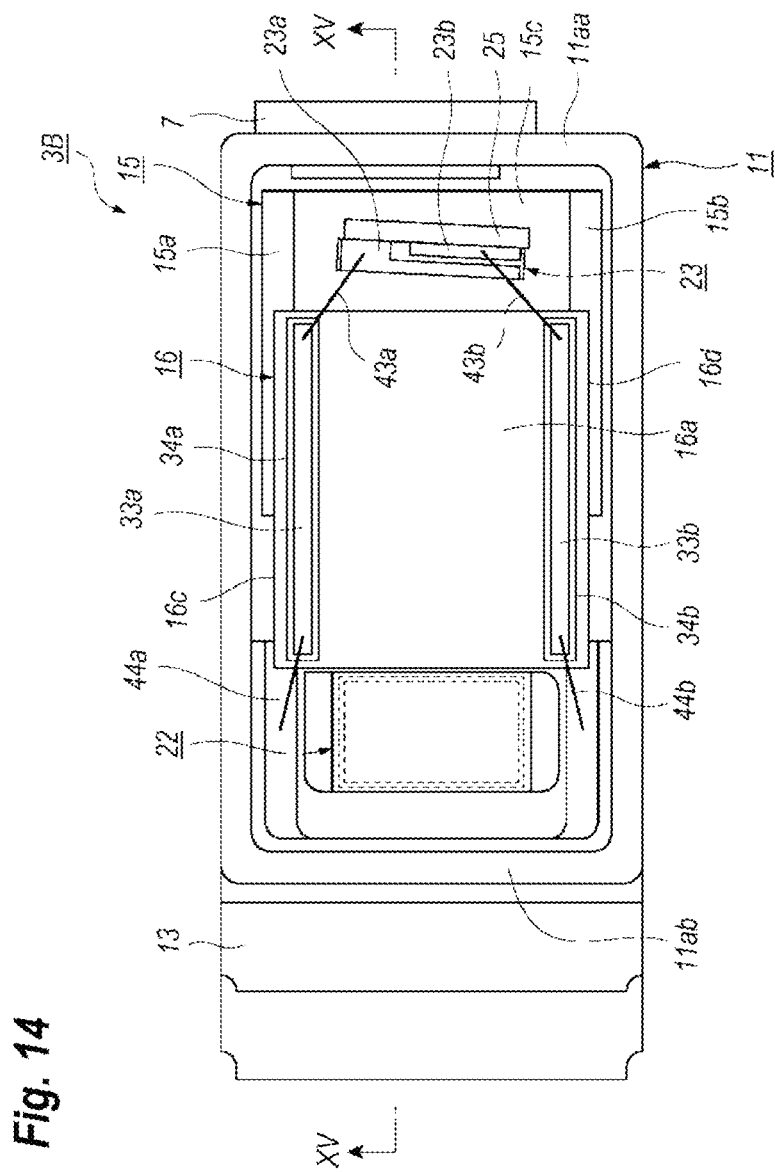
FIG. 14 is a plan view showing an inside of the body unit according to the second embodiment of the present invention.
Figure 15:
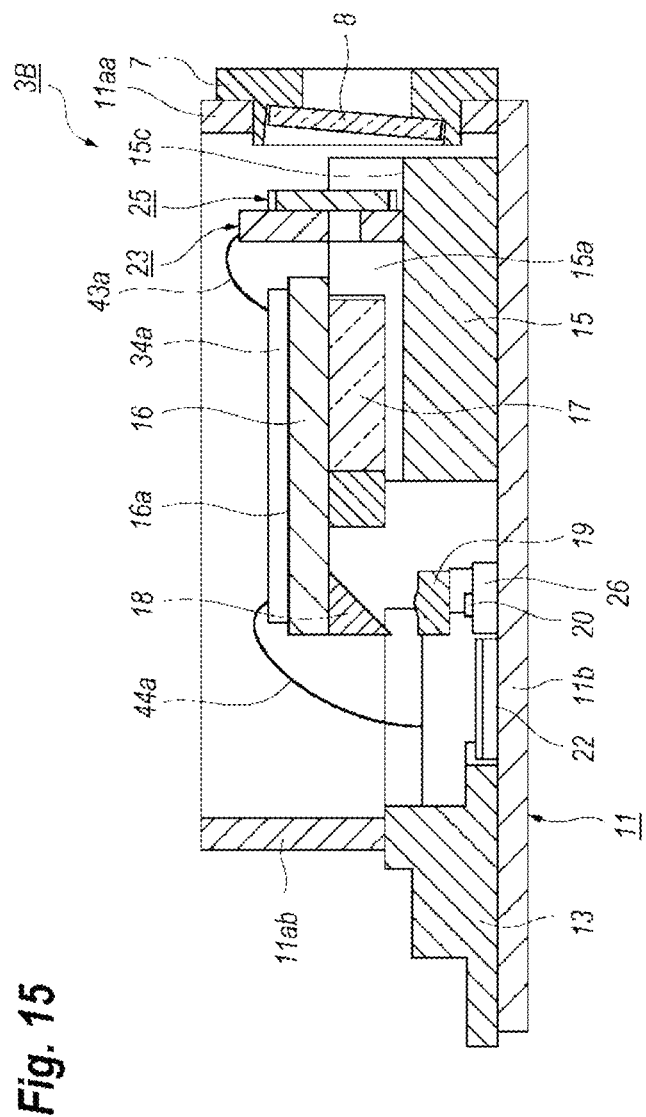
FIG. 15 shows a cross section of the body unit taken along the line XV-XV indicated in FIG. 14.

FIG. 14 is a plan view showing an inside of another body unit 3B of the receiver optical module 1A, while, FIG. 15 shows a cross section of the body unit 3B taken along the like XV-XV indicated in FIG. 14. The arrangement of the coupling unit 2 is the same with those of the first embodiment.

The body unit 3B of the second embodiment provides a pair of wiring substrates, 34a and 34b, instead of the wiring substrate 24 in the first embodiment, where the wiring substrates, 34a and 34b, are disposed on the top surface 16a of the carrier 16 and fixed thereto with an adhesive. Specifically, the wiring substrates, 34a and 34b, which extend along the longitudinal direction of the body unit 3B, are placed along the respective sides, 16c and 16d, of the carrier 16. The carrier 16 has a rectangular plane shape with the sides, 16c and 16d, extending along the longitudinal direction of the body unit 3B.

The wiring substrate 34a provides an interconnection 33a thereon, where the interconnection 33a in one of ends thereof is wire-bonded with the pad 23a on the VOA carrier 23 with a bonding wire 43a, while in another end thereof is wire-bonded with the feedthrough 13 with a bonding wire 44a. The other wiring substrate 34b also provides an interconnection 33b thereon, where the interconnection 33b in one of ends thereof closer to the VOA 25 is wire-bonded with the pad 23b through a bonding wire 43b, while another end thereof is wire-bonded with the feedthrough 13 via a bonding wire 44b.

In the present embodiment of the body unit 3B, the VOA carrier 23 is mounted on the support 15, specifically, a front portion 15c of the support 15 closer to the front wall 11aa of the housing 11, where the front portion 15c is provided between the side walls, 15a and 15b, of the support 15 on which the carrier 16 that mounts the optical de-multiplexer 17 and the mirror 18 in the back surface 16b thereof. That is, the carrier 16 is placed on the rear portion of side walls, 15a and 15b, of the support 15, while, the side walls, 15a and 15b, of the support 15 in the front portion thereof put the VOA 25 therebetween.

In the first and second embodiments of the body units, 3A and 3B, the carrier 16 in the rear portion thereof where the mirror 18 is mounted extends from the rear edge of the support 15. Assuming an amount of the extension in the carrier 16 to be "a", and a thickness of the carrier 16 to be "b"; a ratio a/b is preferably smaller than four (4). This arrangement of the carrier 16 and the support 15 may secure mechanical rigidity in the carrier 16 and, in particular, enable for the bonding wires, 44a and 44b, to be wore-bonded on the rear ends of the interconnections, 33a and 33b, on the wiring substrates, 34a and 34b, in the second embodiment.

The second embodiment of the body unit 3B provides the wiring substrates, 34a and 34b, on the carrier 16, which may form the body unit 3B further compact. Specifically, the carrier 16 mounts the wiring substrates, 34a and 34b, on the top surface 16a thereof, while, the back surface 16b mounts the optical de-multiplexer 17 and the mirror 18. This arrangement of the carrier 16, may eliminate a space between the support 15 and the side wall 11a where the wiring substrate 24 is placed in the first embodiment, which may make the body unit 3B further slim in the lateral direction thereof. Also, this arrangement of the wiring substrates, 34a and 34b, may expose the interconnections, 33a and 33b, provided thereon; which enables the wire-bonding between the interconnections, 33a and 33b, and the pads, 23a and 23b, on the VOA carrier; which facilitates the wire-bonding to the pads, 23a and 23b, and the interconnections, 34a and 34b.

The support 15 of the present embodiment provides the pair of side walls, 15a and 15b, where the carrier 16 is placed thereon. The side walls, 15a and 15b, extend along the longitudinal direction of the body unit 3B and the wiring substrates, 34a and 34b, are mounted in the respective sides of the carrier 16 overlapping with the side walls, 15a and 15b, of the support 15. This arrangement of the side walls, 15a and 15b, may also facilitate the wire-bonding to the interconnections, 33a and 33b, because areas to be wire-bonded provide rigid medium thereunder. Also, the wiring substrates, 34a and 34b, on the top surface 16a of the carrier 16 are not overlapped with the optical de-multiplexer 17 on the back surface 16b of the carrier 16, which may protect the optical de-multiplexer 17 during the wiring bonding to the interconnections, 33a and 33b.

The second embodiment of the body unit 3B mounts the VOA 25 and the carrier 16 on the support 15. When the VOA 25 is mounted on the wiring substrate 24 different from the support 15 as those in the first embodiment, the wiring substrate 24 and the support 15 are necessary to be mounted on the bottom 11b of the housing 11 as securing a space, or a gap, therebetween to receive excess adhesive oozing out from spaces between the wiring substrate 24, or the support 15, and the bottom 11b. The arrangement of the second embodiment where the support 15 mounts not only the carrier 16 but the VOA 25 thereon may save the space between the members and resultantly make the housing 11 compact.

In the foregoing detailed description, the receiver optical modules of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A receiver optical module comprising:
   a coupling unit that receives an optical fiber providing a wavelength multiplexed signal multiplexing optical signals each having a wavelength specific thereto and different from each other;
   an optical de-multiplexer that optically couples with the optical fiber and de-multiplexes the wavelength multiplexed signal provided from the optical fiber, the optical de-multiplexer providing a plurality of multi-layered dielectric films each passing one of the respective optical signals but reflecting other of the optical signals, the multi-layered dielectric films having a rectangular plane shape with a longer side and a shorter side; and
   an optical attenuator provided between the coupling unit and the optical de-multiplexer, the optical attenuator attenuating the wavelength multiplexed signal and having a shutter movable along the longer side of the multi-layered dielectric film,
   wherein the optical de-multiplexer provides a body substantially transparent to the optical signals, the body having a rectangular plane shape with a front side, a rear side, a top surface, and a bottom surface, the front side and the rear side extending in parallel to each other, the front side receiving the wavelength multiplexed signal passing the optical attenuator and having a reflection film thereon, the rear side arranging the multi-layered dielectric films as the shorter sides thereof extending along an edge between the rear side and the top surface.

2. The receiver optical module according to claim 1, wherein the front side of the optical de-multiplexer has a normal inclined with an optical axis of the wavelength multiplexed signal.

3. The receiver optical module according to claim 1, wherein the reflection film in the front side of the optical de-multiplexer reflects the optical signals that are reflected by the multi-layered dielectric films toward the multi-layered dielectric films.

4. A receiver optical module comprising:
   a coupling unit that receives an optical fiber providing a wavelength multiplexed signal multiplexing optical signals each having a wavelength specific thereto and different from each other;
   an optical de-multiplexer that optically couples with the optical fiber and de-multiplexes the wavelength multiplexed signal provided from the optical fiber, the optical de-multiplexer providing a plurality of multi-layered dielectric films each passing one of the respective optical signals but reflecting other of the optical signals, the multi-layered dielectric films having a rectangular plane shape with a longer side and a shorter side;
   an optical attenuator provided between the coupling unit and the optical de-multiplexer, the optical attenuator attenuating the wavelength multiplexed signal and having a shutter movable along the longer side of the multi-layered dielectric film, and
   a wiring substrate and a housing,
   wherein the shutter in the optical attenuator partially overlaps with the wavelength multiplexed signal,
   wherein the wiring substrate provides interconnections that carry electrical signals for controlling the overlapping between the shutter and the wavelength multiplexed signal, and
   wherein the housing includes a front wall and a rear wall, the front wall providing the coupling unit, the rear wall providing a feedthrough including terminals that provides the electrical signals to the wiring substrate.

5. The receiver optical module according to claim 4, wherein the wiring substrate includes a front portion, an intermediate portion, and a rear portion, the front portion mounting the optical attenuator thereon, the rear portion facing the feedthrough in the rear wall of the housing, the intermediate portion being provided between the optical de-multiplexer and a side wall of the housing that connects the front wall with the rear wall.

6. The receiver optical module according to claim 4, further comprising a support and a carrier, the carrier mounting the optical de-multiplexer thereon, the support supporting the carrier, wherein the wiring substrate and the support are arranged side by side along a lateral direction perpendicular to another direction connecting the front wall with the rear wall of the housing.

7. The receiver optical module according to claim 6,
wherein the carrier provides a top surface and a back surface facing the support, the back surface mounting the optical de-multiplexer thereon, and
wherein the support provides a pair of side walls that mount the carrier thereon, the optical de-multiplexer being put between the sides walls of the support.

8. The receiver optical module according to claim 6,
wherein the carrier extends from the support in a rear thereof opposite to a side where the optical attenuator is provided, the rear of the carrier forming a space thereunder where photodiode elements that receive the respective optical signals de-multiplexed by the optical de-multiplexer are provided.

9. A receiver optical module comprising:
a coupling unit that receives an optical fiber providing a wavelength multiplexed signal multiplexing optical signals each having a wavelength specific thereto and different from each other;
an optical de-multiplexer that optically couples with the optical fiber and de-multiplexes the wavelength multiplexed signal provided from the optical fiber, the optical de-multiplexer providing a plurality of multi-layered dielectric films each passing one of the respective optical signals but reflecting other of the optical signals, the multi-layered dielectric films having a rectangular plane shape with a longer side and a shorter side;
an optical attenuator provided between the coupling unit and the optical de-multiplexer, the optical attenuator attenuating the wavelength multiplexed signal and having a shutter movable along the longer side of the multi-layered dielectric film, and
a carrier, a support, two wiring substrates and a housing,
wherein the shutter in the optical attenuator partially overlaps with the wavelength multiplexed signal,
wherein the wiring substrates provide interconnections that carry electrical signals for controlling the overlapping between the shutter and the wavelength multiplexed signal, and
wherein the carrier mounts the optical de-multiplexer and the wiring substrate thereon, and the support supports the carrier and mounts the optical attenuator thereon.

10. The receiver optical module according to claim 9,
wherein the carrier provides a top surface and a back surface that faces the support, the top surface mounting the wiring substrate, the back surface mounting the optical de-multiplexer.

11. The receiver optical module according to claim 10,
wherein the support provides a pair of side walls that mount the carrier thereon, and
wherein the optical attenuator is mounted between the side walls of the support.

12. The receiver optical module according to claim 11,
wherein the side walls support respective edge portions of the carrier, the respective edge portions mounting the respective wiring substrates thereon.

13. The receiver optical module according to claim 9,
wherein the carrier extends from the support in a rear thereof that is opposite to a side where the optical attenuator is provided, the rear of the carrier forming a space thereunder where a photodiode elements that receive the respective optical signals de-multiplexed by the optical de-multiplexer are provided.

* * * * *